United States Patent [19]

Nakao

[11] 4,261,857
[45] Apr. 14, 1981

[54] METHOD AND APPARATUS FOR REGENERATING USED ACTIVE CARBON

[75] Inventor: Kozaburo Nakao, Tokyo, Japan

[73] Assignee: Kyoritsu Yuki Kogyo Kenkyusho, Tokyo, Japan

[21] Appl. No.: 941,239

[22] Filed: Sep. 11, 1978

Related U.S. Application Data

[63] Continuation of Ser. No. 780,234, Mar. 22, 1977, abandoned, which is a continuation of Ser. No. 557,615, Mar. 12, 1975, abandoned.

[30] Foreign Application Priority Data

| May 9, 1974 [JP] | Japan | 49-50722 |
| Sep. 5, 1974 [JP] | Japan | 49-102291 |
| Nov. 13, 1974 [JP] | Japan | 49-13002 |

[51] Int. Cl.³ .................. B01J 20/34; C01B 31/08; F27B 1/08; F27D 11/04
[52] U.S. Cl. ........................... 252/420; 13/7; 13/23; 252/411 R
[58] Field of Search .............. 252/411 R, 420, 445; 13/7, 23; 34/1; 201/19; 13/1

[56] References Cited

U.S. PATENT DOCUMENTS

| 1,585,344 | 5/1926 | Greenwalt | 13/23 |
| 1,671,673 | 5/1928 | Doerschuck et al. | 201/19 |
| 1,784,536 | 12/1930 | Patenburg | 252/411 R |
| 1,937,064 | 11/1933 | Moore | 13/23 |
| 1,975,259 | 10/1934 | Derby | 13/7 |
| 2,270,245 | 1/1942 | Barker | 252/445 |
| 3,396,473 | 8/1968 | Turner | 34/1 |

FOREIGN PATENT DOCUMENTS

| 37-2762 | 5/1962 | Japan | 411 R/ |
| 43-12424 | 5/1968 | Japan | 252/420 |
| 43-12425 | 5/1968 | Japan | 252/411 R |

OTHER PUBLICATIONS

Brochure of Kyoritsu Yuri Kogyo Kenekyusho entitled "Unimech CACT-0400".

Primary Examiner—P. E. Konopka
Attorney, Agent, or Firm—Koda and Androlia

[57] ABSTRACT

Particles of active carbon which have been used to purify contaminated liquid are regenerated by charging the particles between spaced electrodes in a furnace and passing electric current between the electrodes to thereby heat and regenerate the active carbon by the heat generated by the specific resistance of the particles and the contact resistance therebetween.

8 Claims, 18 Drawing Figures

F I G. 1    F I G. 2
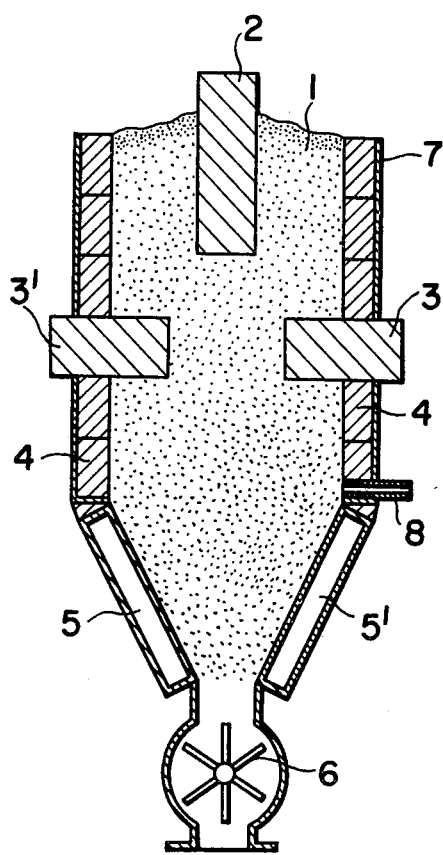
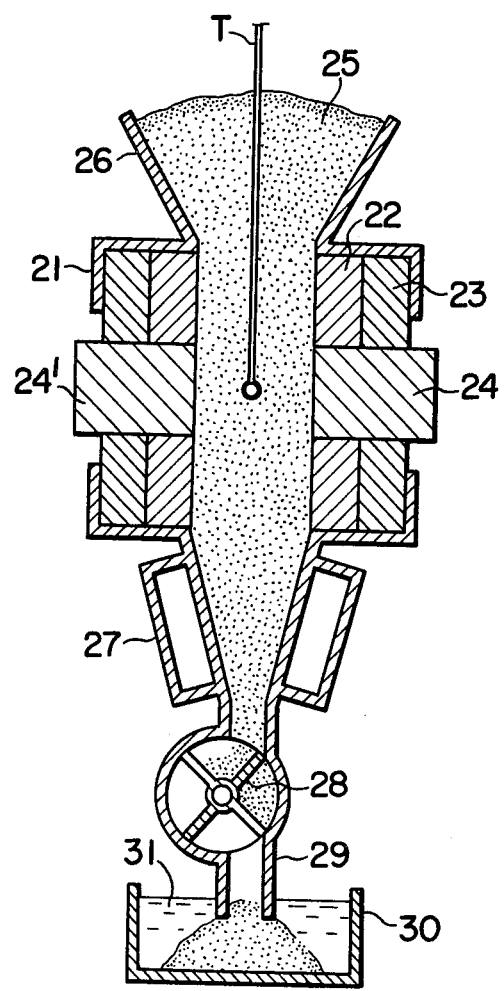

F I G. 10
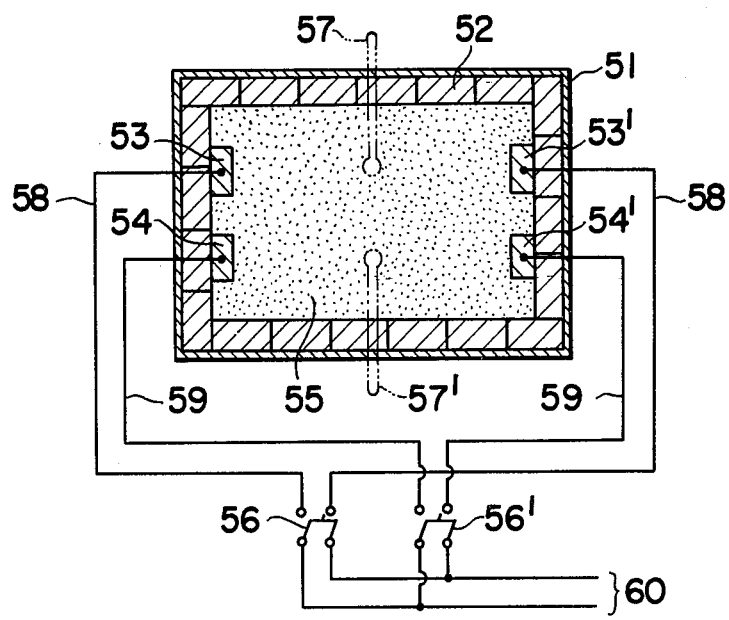
F I G. 11
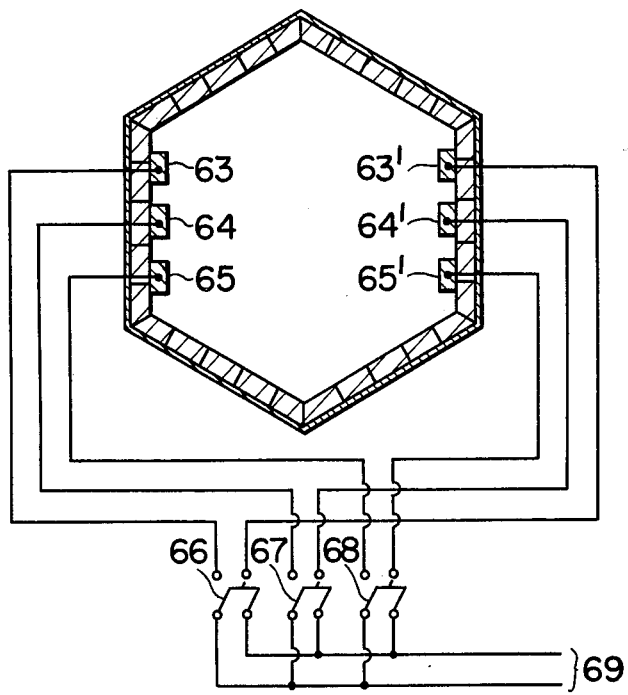

F I G. 13
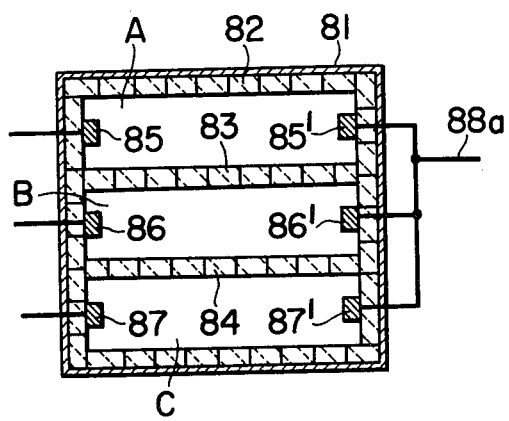
F I G. 14
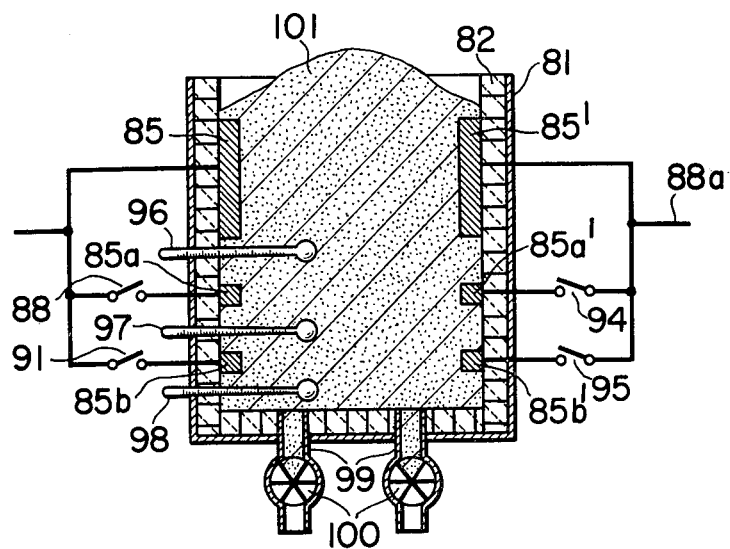

METHOD AND APPARATUS FOR REGENERATING USED ACTIVE CARBON

This is a continuation of application Ser. No. 780,234, filed Mar. 22, 1977 and abandoned, which is a continuation of Ser. No. 557,615 filed Mar. 12, 1975 and now abandoned.

BACKGROUND OF THE INVENTION

This invention relates to a method and apparatus for regenerating used active carbon.

Active carbon has been used extensively in many engineering fields, and recent trends of preventing or minimizing public hazard, especially contamination of river and sea water require to use a large quantity of active carbon. Accordingly, it is necessary to regenerate or reactivate used active carbon.

Since active carbon that has been used to purify contaminated water, such as factory waste water, is wet when it is taken out from the purifying apparatus, in order to regenerate it it is necessary to first heat it to remove moisture and then increase its heating temperature for decomposing and carbonizing contaminants deposited on the particles of the active carbon. Then the temperature is maintained at a temperature between 500° C. to 1,000° C. for a certain interval which varies depending upon the type of the contaminants deposited or adsorbed, thereby reactivating the carbon. For the purpose of decomposing carbonaceous deposit, it is necessary to introduce steam and $CO_2$ gas into the heating chamber containing used activated carbon to be regenerated. Then, the resulting carbonaceous material can be removed by the following reactions $$C + H_2O = CO + H_2$$

$$C + CO_2 = 2CO$$

Among a number of types of prior methods of regenerating used active carbon are included (1) an externally heating system in which a vertical cylinder containing fluidized used active carbon is heated from outside by hot gas, flue gas for example, and steam and $CO_2$ gas are introduced into the bottom of the cylinder, (2) an electric arc type in which used active carbon is admitted into one end of a rotary cylinder and heated by electric arcs struck between a plurality of electrodes which are mounted on the inner surface of the cylinder in the radial direction thereof. If the active carbon is wet it is necessary to introduce steam into the cylinder, and (3) Herrishoff type in which a plurality of vertically spaced shelves and a plurality of rotary distributors are mounted in a vertical cylinder. The used active carbon is introduced into the upper portion, and steam and a mixture of liquid fuel and air are supplied into the lower portion of the cylinder. While being successively transferred onto lower shelves, the used active carbon is heated by the combustion product of the fuel and reacts with the steam and $CO_2$ gas contained in the combustion product. These prior art methods and apparatus are not advantageous in that they require a source of steam and a source of heating gas, the loss of pulverized active carbon is large, and the cost of installation and operation is large.

SUMMARY OF THE INVENTION

According, it is the principal object of this invention to provide an improved method and apparatus capable of eliminating various defects of the prior art described above.

Another object of this invention is to provide improved apparatus capable of maintaining temperature at various portions of the furnace at desired temperatures thereby increasing the efficiency of regeneration.

Still another object of this invention is to provide improved apparatus for regenerating used active carbon which can operate with direct current, single phase or three phase alternating current with batch type or continuous type operation.

A further object of this invention is to provide apparatus for regenerating used active carbon which can also be used to purity contaminated liquid without transferring the active carbon, thus preventing the loss thereof.

Still further object of this invention is to provide improved apparatus for regenerating used active carbon which can decrease non-uniform distribution of current and temperature caused by cracks or voids which are formed when the particles of used active carbon are heated and dehydrated.

According to one aspect of this invention there is provided a method of regenerating used active carbon which comprises the steps of placing a quantity of the particles of used active carbon between spaced electrodes and passing electric current between the electrodes through the particles whereby to heat and regenerate the particles by the heat generated by the specific resistance of the particles and the contact resistance therebetween.

During heating the particles are isolated from ambient air and it is preferable to admit steam in the heating zone.

To assure uniform heating it is advantageous to add a liquid electrolyte to the used active carbon before it is regenerated.

According to another aspect of this invention there is provided apparatus for regenerating used active carbon comprising a furnace provided with spaced electrodes between which particles of used active carbon are to be placed, and means for passing electric current between the electrodes through the particles of active carbon so as to heat and regenerate the same by the heat generated by the specific resistance of the particles and the contact resistance therebetween.

The furnace generally takes the form of a vertical cylinder and opposed electrodes are mounted on the inner surface of the cylinder to extend in the radial or axial direction. In one form a plurality of pairs of vertically spaced electrodes are provided, and in another form an axial central electrode is provided at the center of the cylinder. These electrodes may be energized by DC, single phase or three phase AC.

In one embodiment, the same furnace is constructed to purify contaminated liquid with active carbon and to regenerate the used active carbon without transferring it to another regenerating furnace.

According to another embodiment, the furnace is divided into two sections and the used active carbon is heated and dehydrated in one section and then regenerated in the other section.

BRIEF DESCRIPTION OF THE DRAWINGS

Further objects and advantages of the invention will be more fully understood from the following detailed description taken in conjunction with the accompanying drawings in which:

FIG. 1 shows a longitudinal sectional view of the regenerating furnace embodying the invention;

FIG. 2 shows a longitudinal sectional view of a modified regenerating furnace suitable for a batch system;

FIGS. 10 and 11 are cross-sectional views of modified regenerating furnaces utilizing modified electrode arrangements.

FIG. 13 shows a horizontal cross-sectional view of another embodiment of the regenerating furnace wherein current paths of different phases of three phase alternating currents are electrically isolated from each other;

FIG. 14 shows a vertical sectional view of one compartment of a modification of the embodiment shown in FIG. 13;

DESCRIPTION OF THE PREFERRED EMBODIMENTS

Figure 3:
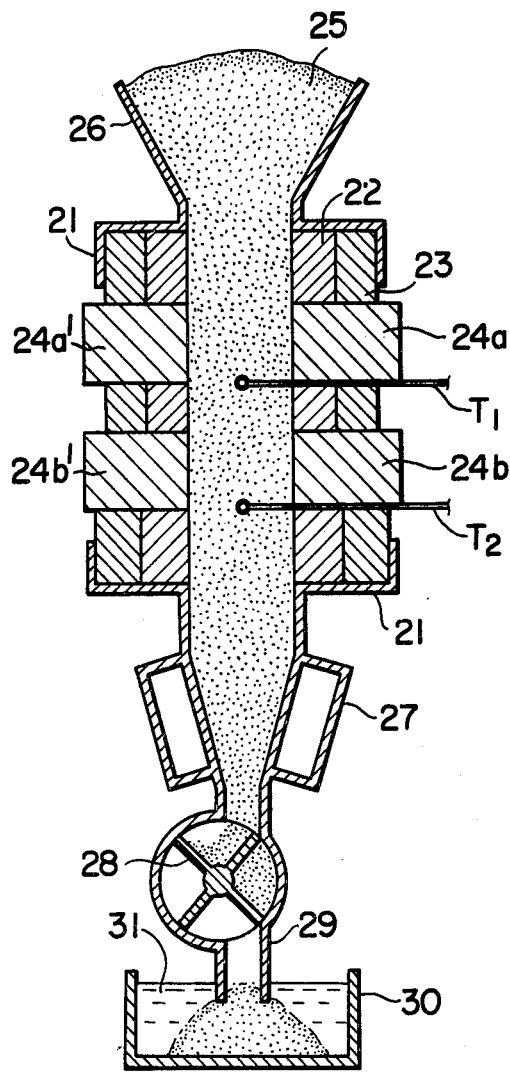
FIG. 3 shows a modification of FIG. 2 which is suitable for a continuous system.

FIG. 1 of the accompanying drawing shows a longitudinal sectional view of a continuous type regenerating furnace or apparatus for regenerating used active carbon. The furnace 7 made of steel plates, for example, is provided with a lining 4 of refractory bricks 4. Disposed in the furnace are an electrode 2 provided at the upper center of the furnace and one or more electrodes 3 and 3' mounted on the side surfaces of the furnace which are connected to one pole of a source of single phase alternating current. The central electrode 2 is connected to the other pole of the source. The particles of the used active carbon 1 to be regenerated are constantly supplied into the furnace from upper. Current is passed between electrodes 2 and 3 and 3' through the particles of the active carbon to heat and regenerate the same. The regenerated active carbon is cooled by a conical water jacket 5 provided at the bottom of the furnace and then discharged to the outside of the furnace by means of a suitable discharge device 6 illustrated as a rotary valve.

When passed by current, the particles of the used active carbon generate heat due to the contact resistance between the particles and the specific resistance of the particles so that impurities that have been deposited on or adsorbed by the particles are decomposed or evaporated off. During the heat treatment air is prevented from entering into the furnace or inert gas or steam is admitted into the surface through an inlet pipe 8.

Of course, the magnitude of current flowing through the particles of the used active carbon is determined by the voltage impressed across the electrodes and the resistance between them, comprising the contact resistance and the specific resistance of the carbon particles. The specific resistance varies in accordance with the temperature whereas the contact resistance between the particles varies dependent upon the content of water contained in the particles and the degree of surface contamination thereof. Although, it was stated that the furnace shown in FIG. 1 operates in continuous mode, it will be clear that the furnace can be operated in batch mode.

In order to investigate decrease in the adsorption ability, percentage of the regenerated active carbon and variation in the load of the furnace when the active carbon is used and regenerated cyclically, following test was made. In the test a rectangular furnace having a width of 300 mm, a depth of 400 mm and a length of 940 mm was used and a pair of spaced carbon electrodes were installed on the side surfaces of the furnace with a spacing of 740 mm. At about the middle between the electrodes was mounted a thermometer and the particles of the used active carbon were filled between the electrodes. A single phase voltage adjustable transformer having a rating of 0 to 200 volts and 70 amperes (maximum) was used as the source for energizing the electrodes. 2.5 kg of starch was dissolved in water and used as a BOD substance, that is an artificial contaminant that decreases biological oxygen demand. This solution was caused to be adsorbed by 40 kg of active carbon to prepare a sample of used active carbon. After dehydration, the sample was loaded in the furnace described above, and the voltage of the source was adjusted to heat the sample at a regeneration temperature of from about 750° C. to 1,000° C. This temperature was maintained for about one hour. At the latter half of the operation a small quantity of steam was admitted into the furnace for enhancing regeneration or reactivation of the active carbon.

Each of adsorbed or used active carbon, regenerated active carbon and fresh active carbon was dried at a temperature of 80° C. for about 24 hour and one gram of each was incorporated into 100 ml of a 100 ppm starch aqueous solution. After stirring for one hour, the COD value (determined by kMn O method) of the solution was measured.

The following Table I shows the variations in voltage, current, calculated value of the resistance and the temperature of the active carbon during the regeneration process.

TABLE I

| Time elapsed Hour-Min. | Voltage V | Current A | Resistance ohm | Temp °C. |
| --- | --- | --- | --- | --- |
| Start | 125 | 50 | 2.5 | 25 |
| 20 | 125 | 58 | 2.2 | 75 |
| 40 | 125 | 62 | 2.0 | 105 |
| 60 | 125 | 50 | 2.5 | 106 |
| 1–20 | 172 | 56 | 3.1 | 110 |

TABLE I-continued

| Time elapsed Hour-Min. | Voltage V | Current A | Resistance ohm | Temp °C. |
|---|---|---|---|---|
| 1-40 | 202 | 45 | 4.5 | 120 |
| 1-50 | 205 | 37 | 5.5 | 137 |
| 2-00 | 205 | 33 | 6.2 | 220 |
| -10 | 205 | 33 | 6.2 | 338 |
| -20 | 202 | 48 | 4.2 | 565 |
| 25 | 167 | 57 | 2.9 | 750 |
| 30 | 125 | 56 | 2.5 | 830 |
| 40 | 122 | 62 | 2.0 | 913 |
| 50 | 94 | 50 | 1.9 | 928 |
| 3-20 | 93 | 60 | 1.6 | 905 |
| 40 | 80 | 54 | 1.5 | 880 |

The regeneration test was repeated 24 times for the same active carbon and it was found that substantially the same tendency was followed in each test although slightly different depending upon the initial quantity of the residual water, and the quantity and composition of the adsorbed contaminant. Thus, Table I shows that, after starting, the resistance (including the contact resistance between the carbon particles, the contact resistance between the carbon particles and the electrodes, and the specific resistance of the carbon particles) increases gradually, reaches a maximum value at about 350° C., then decreases gradually with an attendant increase in the temperature. Thereafter, the regeneration treatment was continued for about one hour at a temperature of around 900° C., thus obtaining regenerated active carbon.

Used or adsorbed active carbon, regenerated active carbon and fresh active carbon were tested for their effeciency of removal of COD and the result is shown in the following Table II.

TABLE II.

| | Residual COD (ppm) | Removed COD (ppm) | % of COD removal | % of removal* |
|---|---|---|---|---|
| Adsorbed active carbon | 69.4 | 25.6 | 26.9 | 53.8 |
| Regenerated active carbon | 48.5 | 46.5 | 49 | 98 |
| Fresh active carbon | 47.5 | 47.5 | 50 | 100 |
| Liquid purified | 95 | — | — | — |

*The percentage of COD removal of the fresh active carbon was taken as 100%.

Although among the results of 24 repeated tests some showed a minimum regeneration percentage of 94%, most of them showed a percentage of from 95 to 99%. Table II shows that while the used active carbon has only 53.8% of activity when compared with fresh active carbon, the regenerated active carbon reactivated by the method of this invention has substantially the same activity as the fresh active carbon.

The yield of the regenerated active carbon is extremely high, e.g. 92%, even after 24 times of repeated regeneration treatments, such high yield being believed to be caused by the fact that the carbon particles were maintained stationary during the regeneration treatment. The power consumed in each test was from 25.6 KWH to 22.6 KWH and varied slightly depending upon the initial moisture content, the quantity of the BOD substance adsorbed and the time at which the power supply was interrupted so that the power consumption required for regenerating one kilogram of the used active carbon was equal to 25.6 KWH±40=0.64 KWH/kg.

Similar test was made by using a larger rectangular furnace having a width of 675 mm and a depth of 400 mm. Three spaced electrodes were mounted on the inside of each side wall with a spacing of 760 mm between opposed pair of electrodes, and thermometers were mounted between respective pairs of the electrodes. Table III below shows the result of this test.

TABLE III

| Time elasped Hour-Min. | Voltage V | Current A | Resistance ohm | Temperature* | | |
|---|---|---|---|---|---|---|
| | | | | $T_1$ | $T_2$ | $T_3$ |
| Start | 100 | 110 | 0.9 | 20 | 20 | 20 |
| 1-0 | 110 | 85 | 1.3 | 60 | 65 | 58 |
| 2-0 | 140 | 68 | 2.0 | 70 | 70 | 65 |
| 3-0 | 151 | 62 | 2.4 | 75 | 70 | 74 |
| 4-0 | 161 | 75 | 2.15 | 105 | 115 | 100 |
| 11 4-30 | 135 | 91 | 1.53 | 115 | 123 | 125 |
| 5-0 | 103 | 106 | 0.97 | 270 | 290 | 310 |
| 5-30 | 90 | 120 | 0.75 | 590 | 580 | 550 |
| 6-0 | 83 | 128 | 0.65 | 750 | 770 | 780 |
| 6-30 | 80 | 137 | 0.59 | 825 | 875 | 840 |
| 7-0 | 60 | 115 | 0.52 | 890 | 930 | 900 |
| 7-30 | 50 | 111 | 0.45 | 920 | 960 | 950 |
| 8-0 | 40 | 100 | 0.40 | 950 | 980 | 970 |

*There were three pairs of opposed electrodes. $T_2$ represents the temperature of furnace at the middle point between the center pair of the electrodes and $T_1$ and $T_2$ the temperatures at middle points between the side pairs of the electrodes.

In this case, the power was increased rather gradually and the maximum resistance value appeared at an early stage (i.e. at a voltage of 151 V). However, when the power was increased more rapidly, the maximum resistance value appeared at a later time, that is at a higher temperature as in the first test in which only a single pair of electrodes was used. In this case, 92 kg of the used active carbon was charged and the power consumption was 71 KWH or 0.77 KWH/kg.

Again, the effeciencies of removal of COD of the used active carbon, regenerated active carbon and fresh active carbon were measured and the result is shown in the following Table IV.

TABLE IV

| | | Residual COD ppm | Removed COD ppm | % of COD removal | % of removal* |
|---|---|---|---|---|---|
| Absorbed active carbon | | 71.0 | 27.7 | 28 | 50.6 |
| Regenerated active carbon | portion 1** | 45.1 | 53.7 | 54.3 | 98 |
| | portion 2 | 44.6 | 54.2 | 54.9 | 99.2 |
| | portion 3 | 45.5 | 53.3 | 53.9 | 97 |
| Fresh active carbon | | 44.2 | 54.6 | 55.3 | 100 |
| Liquid purified | | 98.8 | — | — | — |

*The percentage of COD removal of fresh active carbon was taken as 100%.
**Portion 2 corresponds to the location of the thermometer between the middle pair of electrodes and portions 1 and 2 correspond to the locations of the thermometers on both sides.

FIGS. 2 and 3 show modified embodiments of this invention especially suitable for the regeneration of active carbon that has been used to remove BOD substances. In the embodiment shown in FIG. 2, a cylindrical furnace 21 is provided with a lining composed of refractory bricks 22 and heat insulating bricks 3 and a pair of diametrically opposite electrodes 24 and 24'. A hopper 26 for loading used active carbon 25 is provided at the top of the furnace and a funnel shaped water jacket 27 is provided at the bottom. To the bottom of the water jacket 27 is connected a rotary valve or discharge device 28 with its discharge pipe 29 immersed in water 31 contained in a water tank 29 for preventing air from entering into the furnace. A thermometer T is inserted into the furnace to measure the temperature in the furnace at a point intermediate the electrodes 24 and 24'.

In operation, particles of used active carbon 25 are charged into the furnace through hopper 26 and DC or single phase AC voltage is impressed across the electrodes 24 and 24' to heat the used active carbon as above described. Then, the BOD substance which has been adsorbed by the active carbon will be decomposed by the heat generated by the particles of the active carbon thus regenerating the same under a condition in which air is interrupted from entering into the furnace. The regenerated active carbon is discharged into the water tank 30 by the operation of the discharge device 28 which may be rotated intermittently.

As an example, in a furnace having a square heating chamber having four sides, each 30×30 cm, carbon electrodes 24 and 24' each having an opposing area of 30×30 cm were mounted at a spacing of 30 cm.

Sample active carbon used in the test was prepared by causing it to adsorbe a 1,000 ppm aqueous solution (substantially saturated) of starch and then removing water by drainage. When charged with this sample, the resistance between the electrodes was measured to be about 2 ohms. When AC voltage of 100 V was impressed across the electrodes the temperature of the wet active carbon was increased gradually and as the moisture was evaporated off, the resistance between the electrodes was also increased. After the temperature measured by the thermometer has increased beyond 100° C. the resistance between electrodes decreased gradually whereas the temperature increased. After the temperature has reached about 500° C., the resistance remained at a constant value of 1 ohm. Thereafter the temperature has reached about 900° C. This temperature was maintained for about 2 hours and the regenerated active carbon was discharged into the water tank 30 by the discharge device 28. The percentage of regeneration was about 98% and the yield was about 95%.

FIG. 3 shows a modification of this invention which is suitable for continuous operation. This embodiment is similar to that shown in FIG. 2 except that two pairs of electrodes 24a, 24a' and 24b, 24b' were disposed in the upper and lower portions of the furnace. Thermometers $T_1$ and $T_2$ were mounted to measure the temperatures of the furnace at portions immediately below respective electrode pairs. Other component parts are designated by the same reference numerals as in FIG. 2. Two pairs of electrodes were insulated electrically from each other. The upper pair was used to evaporate off the moisture contained in the used active carbon 25 and to increase the temperature thereof, whereas the lower pair was used to maintain the temperature at a desired regeneration temperature.

With the same dimensions of the furnace and electrodes as in FIG. 2, both electrode pairs were energized by a source of 100 V, and the speed of the rotary discharge device 28 was adjusted such that the active carbon stays for about two hours between the lower electrode pair 24b and 24b'. The voltage impressed across the upper electrode pair 24a, 24a' was automatically adjusted so that the temperature measured by thermometer $T_1$ will not exceed 1,000° C., whereas the voltage impressed across the lower electrode pair 24b and 24b' was also automatically adjusted so as to compensate for the heat loss but the temperature measured by the thermometer $T_2$ will not exceed 1,000° C. When the furnace shown in FIG. 3 was operated at a rate of discharge of the regenerated active carbon of 5 kg/hr, the percentage of regeneration was 99% and the yield was 96%. The power consumption was 1.3 KWH/kg of the regenerated active carbon.

In the embodiments shown in FIGS. 2 and 3 it is also possible to supplement steam into the furnace. It is also to be understood that instead of using DC or single phase alternating current it is also possible to use three phase alternating current in which case each pair of electrodes comprises three electrodes spaced apart 120° about the periphery of the furnace.

In the embodiments shown in FIGS. 1, 2 and 3 only one or two pairs of the opposing electrodes are used. As described above in connection with the embodiment shown in FIg. 3, the upper electrode pair is used to heat and evaporate off the moisture. However, the heat quantity required for this purpose amounts to about two third of the total heat quantity. Further, as described above the resistance and the temperature increase as the active carbon descends through the furnace and since it is necessary to hold the active carbon at the regeneration temperature of above 900° C. for considerable interval, with only one pair of electrodes it is impossible to obtain uniform distribution of current and hence temperature. Moreover, the ranges of the regeneration temperature and stay time vary dependent upon the substance which the active carbon has adsorbed, so that it is necessary to finely adjust the heat quantity supplied by the electrodes at each stage of the downward movement of the active carbon. However, such fine adjustment is impossible with only one or two pairs of electrodes.

Figure 4:
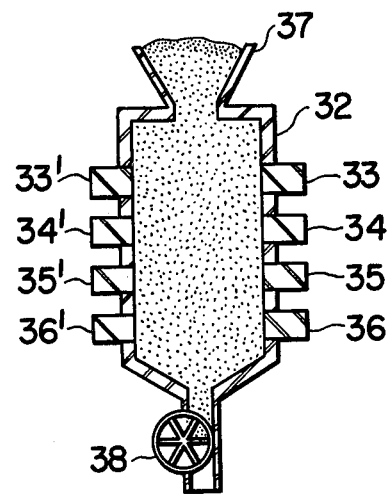
FIG. 4 shows a longitudinal sectional view of a modified regeneration furnace utilizing four stages of electrode pairs.
Figure 5:
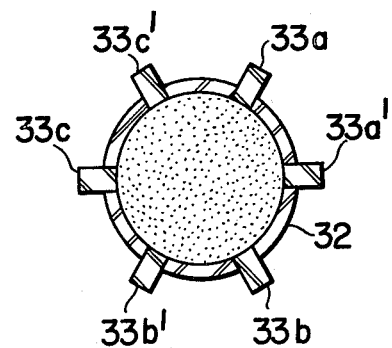
FIG. 5 shows a cross-sectional view of the furnace shown in FIG. 4 but showing two sets of three phase electrodes in one stage.

FIGS. 4 and 5 show modified embodiments of this invention wherein more than two electrode pairs each energized by DC, single phase AC or three phase AC are disposed along the length of the vertical furnace so as to supply adequate heat quantity for respective stages and to provide more uniform temperature distribution by adjusting the voltages or power supplied to respective electrode pairs. In the embodiment shown in FIG. 4, a vertical cylindrical furnace 22 is provided with four pairs of electrodes 33—33', 34—34', 35—35' and 36—36' which are spaced from each other in the vertical direction. The used active carbon loaded into the furnace through a hopper 37 is heated, dehydrated and regenerated while it moves downwardly through the spaces between successive electrode pairs.

While the active carbon is passing between electrodes 33 and 33' of the uppermost stage, its content of water is highest so that it is necessary to supply a largest power across electrodes 33 and 33' and the powers supplied across succeeding electrode pairs should be adjusted to adequate values necessary for regeneration. Thus, electrode pair 33—33' is used mainly for the purpose of drying, electrode pairs 34—34' and 35—35' for increasing the temperature and the fourth electrode pair 36—36' for maintaining the elevated temperature.

If the power supplied by two electrodes 33-33' of the uppermost stage is not sufficient so that drying is not sufficient or the power supplied by these electrodes does not establish a desired balance with respect to the powers supplied by the electrodes of other stages, two sets of three phase electrodes 33a, 33b, 33c and 33a', 33b' and 33c' may be provided for the uppermost stage, as shown in FIG. 5. These two sets of three phase electrodes are interleaved each other. Electrodes of the succeeding stages may be constructed similar to the uppermost stage. In another embodiment, the number of stages of the electrode pairs was increased to seven.

In one example, a regenerating furnace having an inner diameter of 60 cm and a height of 125 cm was provided with seven stages of electrodes, each stage comprising two sets of interleaved three phase electrodes as shown in FIG. 5. Each electrode comprised a carbon rod of 10 cm×10 cm. As a sample of activated carbon which has adsorbed BOD substance, active carbon was dipped in an aqueous solution of alkylbenzene sulphonic acid and then drained. This sample was charged from upper into the furnace for continuous regeneration. Electrodes of the first to fourth stages were used for drying, electrodes of the fifth and sixth stages were used for elevating the temperature and electrodes of the seventh stage were used for maintaining the elevated temperature. More particularly, three phase AC voltage of 70 V was impressed across the electrodes of the first and second stages, 80 V across the electrodes of the third and fourth stages, 50 V across the electrodes of the fifth and sixth stages and 30 V across the electrodes of the seventh stage. In this manner, regenerated active carbon was continuously obtained at a rate of 10 kg/hr.

Where the sample was prepared by causing the active carbon to adsorbe aqueous solution of starch three phase 120 V was impressed across the electrodes of the first and second stages, 110 V for the electrodes of the third and fourth stages, 72 V for the electrodes of the fifth and sixth stages and 30 V for the electrodes of the seventh stage. In this case, regenerated active carbon was produced at a rate of 14 kg/hr. The efficiency of regeneration was 97% and yield of the regenerated active carbon was 98%.

It was found that the embodiments shown in FIGS. 4 and 5 are also useful for initially activating carbon particles.

In still further modification shown in FIGS. 6 to 9, one of the electrodes is disposed at the axial center of a cylindrical regenerating furnace for the purpose of making move uniform the current and temperature distributions in the furnace.

Figure 6:
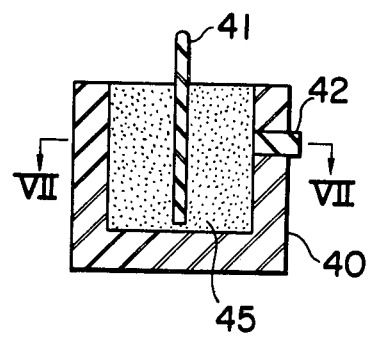
FIG. 6 shows a diagrammatic longitudinal sectional view of another modified embodiment of this invention wherein a central electrode is used.
Figure 7:
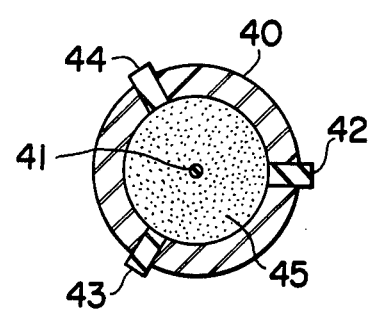
FIG. 7 shows a cross-sectional view of the furnace shown in FIG. 6 taken along line VII—VII.
Figure 8:
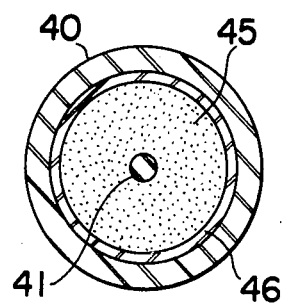
FIGS. 8 and 9 are cross-sectional views showing modified arrangements of the outer electrodes.
Figure 9:
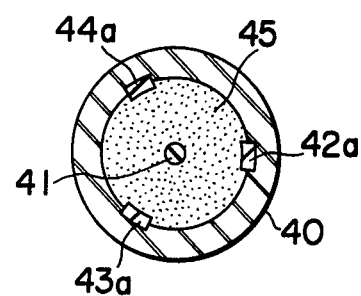

Thus, in the embodiment shown in FIGS. 6 and 7, at the axial center of a cup shaped regenerating furnace 40 is disposed a central electrode 41 and three radial electrodes 42, 43 and 44 are disposed at an equal circumferential spacing. Electrodes 42, 43 and 44 are connected to a source of three phase alternating current and the central electrode 41 is connected to the neutral point of the source. Where direct current or single phase alternating current is used, electrodes 42, 43 and 44 are connected together or may be substituted by a single annular electrode 46 as shown in FIG. 8. Further instead of using radial electrodes it is also possible to use longitudinal electrodes 42a, 43a and 44a as shown in FIG. 9. In any case, it is possible to make more uniform the current and temperature distributions in the particles of the active carbon 45 than the case where the central electrode 41 is not used.

Although for the sake of simplicity, in FIGS. 6 to 9 the regenerating furnaces have been shown as a simple cup form it will be clear that the furnace can be constructed as a vertical cylinder provided with a hopper, a water jacket and a discharge device as has been described in connection with previous embodiments.

It is also a feature of this invention to use metal electrodes. Carbon electrodes not only wear out rapidly but also are bulky and brittle. Furthermore, their mounting on the furnace wall and supply of current to carbon electrodes are not easy. Accordingly, the invention contemplates use of metal electrodes in lieu of carbon electrodes. Chromium, nickel, nickel-chromium alloys, heat resistant steel or cast iron, cupper or any other heat resistance metals or alloys in the form of rods or plates may be used. Metal electrodes are easy to shape and mount, can well resist against heat and corrosion, occupy less space, easy to work and to connect with lead wires.

In another embodiment shown in FIG. 10 a regenerating furnace 51 having a rectangular cross-section and lined with refractory bricks 52 is provided with two pairs of opposing electrodes 53, 53' and 54, 54' mounted on the opposite sides. Electrodes 53 and 53' of one pair are connected to a source 60 through conductors 58 and a double pole switch 56 whereas electrodes 54 and 54' of the other pair are connected to the source 60 through conductors 59 and a double pole switch 56'. Thermometers 57 and 57' are disposed intermediate of respective pairs of the electrodes.

Even when both switches 56 and 56' are closed and current flows in parallel through used active carbon 55 between the pairs of electrodes both thermometers 57 and 57 do not generally show the same temperature. For example, when one thermometer 57 shows the upper limit temperature of 1,000° C., the other thermometer 57' often shows a lower temperature indicating that the portions of the active carbon between electrodes 54 and 54' has not yet been fully regenerated. In such a case the switch 56 for electrodes 53 and 53' is opened until the thermometer 57' shows the limit temperature. During such interval, should the temperature of the active carbon between electrodes 53 and 53' decreases below the limit temperature, the switch 56 is closed again. In this manner, switch 56 is ON-OFF controlled until the temperature of the active carbon between electrodes 54 and 54' reaches the limit temperature 1,000° C. for example. Such intermittent ON-OFF control of the switches may be made manually or automatically.

If two poles of respective switches are operated independently so as to deenergize only one electrode of the pair, for example electrode 53, then current would flow between electrode 54 and electrodes 53' and 54', thus causing overheating of the electrode 54. However, by simultaneously operating two poles of each switch such defect can be overcome.

It is to be understood that more than two pairs of opposing electrodes can be provided.

In addition to the electrode arrangement described above, it is also desirable to make uniform as far as possible the electric resistance between respective pairs of electrodes so as to stabilize current and to assure uniform temperature rise of various portions. To this end it is advantageous to make the cross-sectional configuration of the furnace 51 to be hexagonal, or octagonal as shown in FIG. 11 and to provide three pairs of electrodes 63, 63'; 64, 64' and 65, 65' on the opposing sides which are connected in parallel to the source 69 through double pole switches 66, 67 and 68, respectively.

By this construction, it is possible to make equal the volume passed by the current flowing between side electrode pair 63–63' or 65–65' to that passed by the current flowing between the middle pair 64-64', thus assuring uniform heating.

As has been pointed out before, the electric resistance of the used active carbon is high at the initial stage of heating (e.g. until the temperature reaches to about 100° C.) due to a large quantity of water content. For this reason it is necessary to increase the voltage during this periode. It is also advantageous to add such electrolytes as sodium chloride, calcium chloride, sodium sulphate or caustic soda to the used active carbon to be regenerated. The quantity of the electrolyte may be about 1 to 3% preferably 2%, based on the weight of the active carbon. Addition of such electrolytes further assures uniform resistance and uniform heating.

According to the prior art method and apparatus, for the purpose of purifying waste water containing BOD or COD substance, it is usual to use two tanks, that is a purifying tank and a regenerating tank or furnace. More particularly, used active carbon which has absorbed BOD or COD substance is taken out from the purifying tank and after removing water the used active carbon is charged into the regenerating tank or furnace which requires a large labour, as well as a large floor space and causes loss of the used active carbon.

Figure 12:
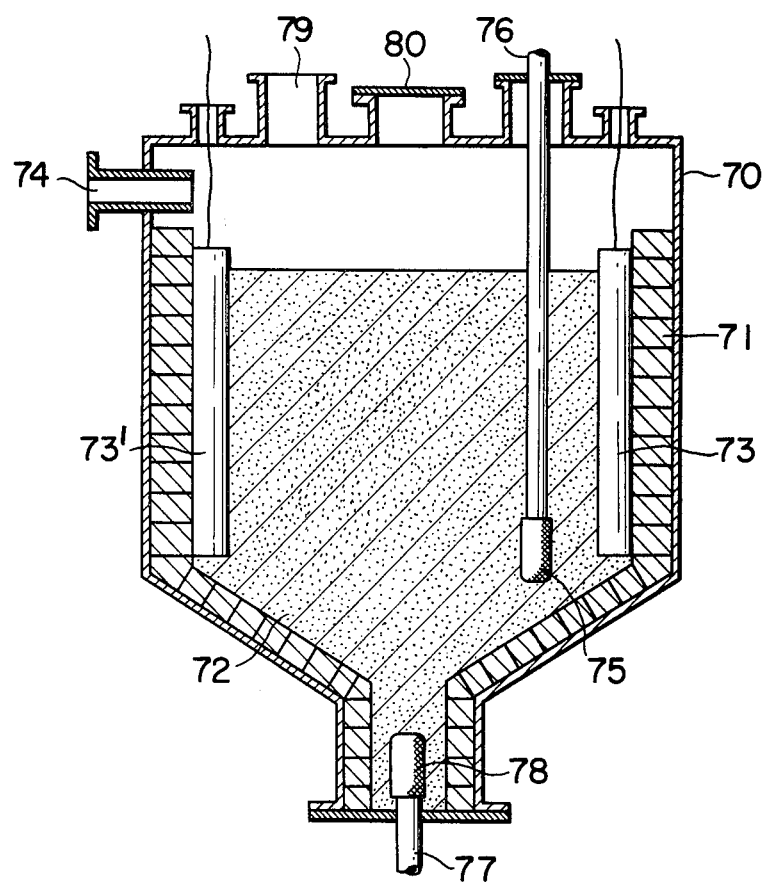
FIG. 12 shows a longitudinal sectional view of a combined purifying and regenerating tank embodying the invention in which a single tank is used for purification and regeneration.

According to the modified embodiment shown in FIG. 12, such defects can be readily obviated by using the purifying tank as the regenerating tank. More particularly, a tank 70 having a reduced bottom is lined with refractory bricks 71 and provided with two or more electrodes 73 and 73' to be used for regeneration. An inlet opening 74 for admitting contaminated water, a discharge pipe 76 provided with a filter 75 for discharging purified water, and a gas vent opening 79 are provided on the upper portion of the tank. A drain pipe 77 having a filter 78 at its upper end extends through the bottom of the tank.

To purify contaminated water (or other liquid) a quantity of fresh active carbon 72 is partially filled in the tank 70 by removing a lid 80 and the water to be purified is admitted into the tank through inlet opening 74. The purified water is discharged to the outside through discharge pipe 76.

When the activity of the active carbon 72 has decreased below a permissible limit by absorbing countaminants admission of the water is terminated, and the water remaining in the tank is permitted to drain as far as possible through pipe 77. Then current is passed through the used active carbon by energing electrodes 73 and 73' for regenerating the active carbon in a manner described above. After regeneration, the active carbon is left standstill until it is cooled or by blowing suitable inert gas into the tank 70 through the drain pipe 77. Regenerated and cooled active carbon can be used for the next purifying cycle.

In one example, a tank having a square cross-sectional configuration of 70 cm×70 cm and a depth of 120 cm was used and 400 l of fresh active carbon was charged into the tank by opening lid 80. Then, contaminated water, for example waste water containing BOD substance, was purified. When the activity of the active carbon approached its end point, admission of the contaminated water was ceased. Then the water contained in the used active carbon was drained through pipe 77 to a content of 80% on dry base. When single phase alternating current of 60 V was impressed across the electrodes 73 and 73' current of about 120 A was passed through the active carbon. With increase in the temperature current was reduced to about one half, and as the temperature of the active carbon exceeded current was increased again. When the temperature has increased above 800° C., current of about 150 amperes was passed under an impressed voltage of 30 V. A temperature of from 800° to 900° C. was maintained for about 1.5 hours thus completing regeneration. The total time required for regeneration was about 15 hours and the total power consumption was 100 KWH. The percentage of regeneration of the activity was 98% and the yield of the regenerated active carbon was 99%.

In this manner, according to this embodiment it is not only necessary to install independent purifying tank and regenerating tank, thus decreasing cost of installation but also to transfer used active carbon from the purifying tank to the regenerating tank thus decreasing the cost of operation and loss of the active carbon.

Where a single phase regenerating furnace is connected across a source of three phase alternating current, an unbalanced load is applied. Although such unbalance can be avoided by using a three phase furnace as shown in FIGS. 7 and 9, the load often becomes unbalance due to the flow of current between electrodes of different phases.

Even in the modified embodiments shown in FIGS. 5, 7 and 9 wherein three phase electrodes and a neutral electrode are used a slight unbalance occurs due to the fact that current flows between electrodes of different phases. According to the embodiments shown in FIGS. 13, 14 and 15 such unbalanced load can be avoided.

Thus, in the embodiment shown in FIG. 13 which shows a horizontal cross-section of a rectangular regenerating furnace 81, the interior of the furnace lined with refractory bricks 82 is divided into three compartments A, B and C by means of vertical partition walls 83 and 84 of electrical insulating and refractory material such as refractory bricks. On the opposite furnace walls of respective compartments A, B and C are mounted three pairs of confronting electrodes, 85–85', 86–86' and 87–87', of which electrodes 85, 86 and 87 are connected to respective phase conductors of a source of three phase alternating current (not shown) whereas other electrodes 85', 86' and 87' are commonly connected to the neutral point of the source through a neutral conductor 88a. As described before, it is advantageous to connect a single phase auto-transformers between respective electrodes 85, 86 and 87 and three phase supply conductors for varying the phase voltages.

Partition walls 83 and 84 electrically isolate the current paths of respective phases so that there is no tendency of current flow between electrodes of different phases. As a consequence, it is possible to uniformly heat active carbon in respective chambers, thus applying a balanced load upon the source. The active carbon to be regenerated is charged into the compartments in a direction perpendicular to the sheet of the drawing. The furnace shown in FIG. 13 is suitable to act as batch type.

Figure 15:
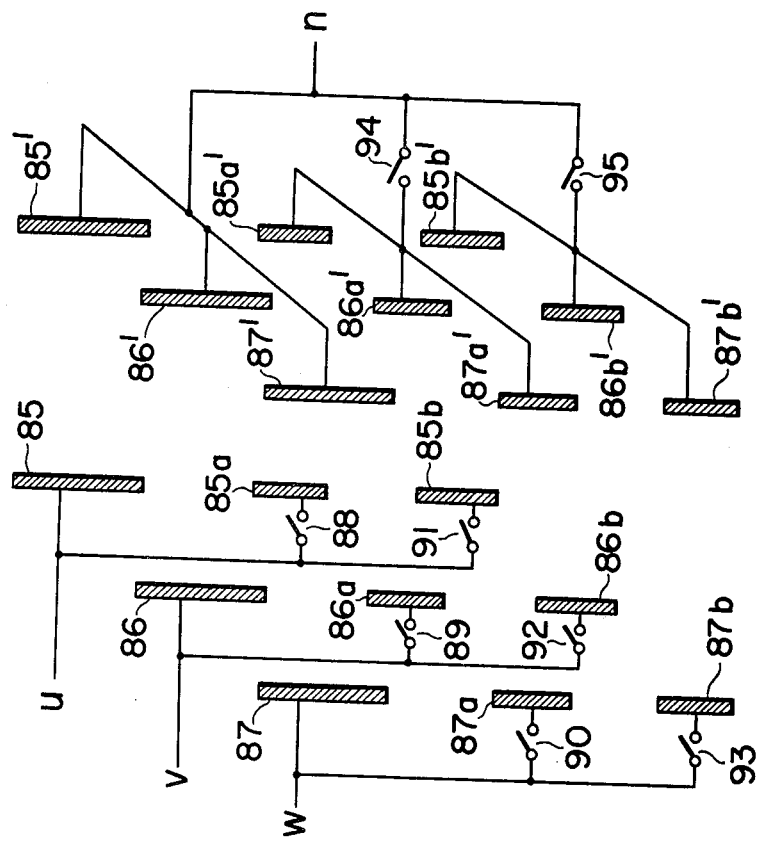
FIG. 15 is a perspective view of various electrodes and electrical connection of the embodiment shown in FIG. 14.

FIG. 14 shows a vertical cross-sectional view of one compartment of another embodiment suitable for continuous operation. It should be understood that, like the regenerating furnace shown in FIG. 13, the furnace 81 shown in FIG. 14 and provided with a lining 82 of refractory bricks is also divided into three compartments by means of electric insulating and refractory partition walls, not shown, extending in the vertical direction. FIG. 15 shows the arrangement and electrical connection of the electrodes provided for the furnace shown in FIG. 14.

Considering a particular compartment shown in FIG. 14 which corresponds to compartment A shown in FIG. 13, a pair of opposing electrodes 85 and 85' are mounted on the upper portion of the opposite inner walls of the furnace and two pairs of additional opposing electrodes 85a, 85a' and 85b, 85b' are mounted on the lower portion beneath electrodes 85 and 85', respectively. In other two compartments, electrodes 86, 86', 86a, 86b, 86a', 86b', 87, 87' 87a, 87a', 87b and 87b' are mounted in the same manner as diagrammatically shown in FIG. 15. Upper electrodes 85, 86 and 87 on the upper left side are connected to phase conductors u, v and w, respectively, of a three phase AC source whereas the upper electrodes on the upper right side are commonly connected to a neutral conductor n. Electrodes 85a, 86a and 87a are connected to source conductors u, v and w respectively through single pole switches 88, 89 and 90, respectively and electrodes 85b, 86b and 87b are also connected to the supply conductors respectively through single pole switches 91, 92 and 93. Electrodes 85a', 86a' and 87a' are commonly connected to the neutral conductor n through a single pole switch 94. Similarly, electrodes 85b', 86b' and 87b' are commonly connected to the neutral conductor n through a single pole switch 95. Switches 88, 89, 90 and 94 are interlocked with each other to operate simmultaneously, and switches 91, 92, 93 and 95 are also interlocked with each other. Thermometers 96, 97 and 98 are provided between electrodes 85 and 85a, between electrodes 85a and 85b and below electrode 85b, respectively. The thermometer 97 is used to simultaneously operate switches 88, 89, 90 and 94 whereas the thermometer 98 is used to smultaneously operate switches 91, 92, 93 and 95. Regenerated active carbon is discharged through one or more discharge pipes 99 connected to the bottom of the furnace and provided with rotary discharge devices 100.

At first, the rotary discharge devices 100 are maintained inoperative and used active carbon 101 is charged in the regenerating furnace 81. At first all electrodes are energized to heat and regenerate the active carbon 101. The temperatures of respective zones are controlled by energizing and deenergizing electrodes 85a, 85a', 86a, 86a', 87b and 87b' under the control of the thermometers 96, 97 and 98.

More particularly, as the uppermost thermometer 96 shows that the temperature of the upper zone reaches a upper limit, 1000° C., for example, two discharge devices 100 are operated simultaneously to continuously discharge the regenerated active carbon from the bottom of the furnace. Then the used active carbon 101 descends and when the thermometer 96 shows a lower limit temperature, 600° C., for example, the operation of the discharge devices 100 is stopped. When the intermediate thermometer 97 shows the upper limit temperature, switches 88, 89, 90 and 94 are opened simultaneously, whereas when the thermometer 91 shows the lower limit temperature, these switches are closed simultaneously. The lowermost thermometer 98 is used to similarly control the switches 88, 89, 90 and 94 to accurately control the temperature in various regions thereby effectively regenerating the used active carbon. In this manner, as switch groups 88, 89, 90 and 94, and 91, 92, 93 and 95 are respectively operated simultaneously it is possible to prevent current from flowing between one electrode and two electrodes opposing thereto which often occurs when one of the two opposed electrods is deenergized by using not interlocked single pole switches. When electric current flows between one electrode and two electrodes opposing thereto, it is difficult to control the temperature as desired and hence to cause non-uniform temperature distribution. Further, there is a fear of overheating and burn out of the electrodes.

In the foregoing embodiments a single regenerating furnace is used irrespective whether it is operated as batch type or continuous type. However, when wet used active carbon is heated in a single regenerating furnace by passing current through the active carbon, as the same dries its volume reduces with the result that cracks and voids are formed in the charged active carbon. This results in non-uniform resistance and temperature distributions thus causing inefficient and non-uniform regeneration.

Figure 16:
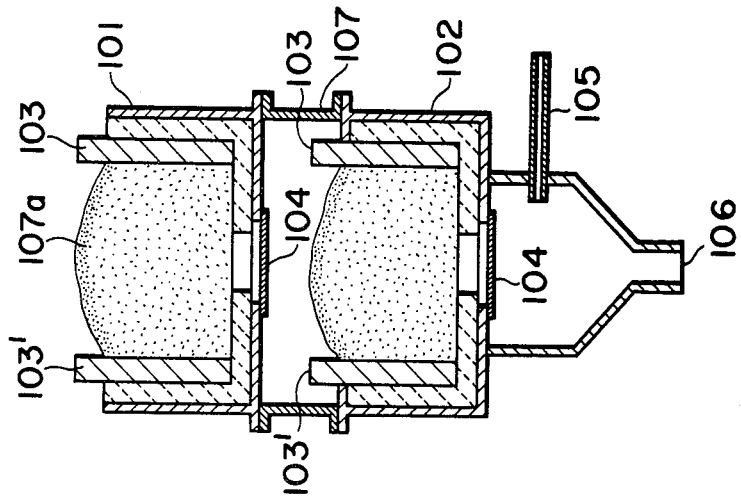
FIG. 16 shows a modified regenerating furnace comprising two sections.

FIG. 16 shows a diagrammatic sectional view of still another modification of this invention constructed to avoide the difficulties just mentioned. In this embodiment the regenerating furnace comprises two vertically aligned sections 101 and 102 interconnected by a connecting member 107, each section containing a pair of opposed electrodes 103 and 103' and a bottom opening normally closed by a damper 104. The bottom section 102 is provided with a pipe 105 for admitting steam and a discharge port 106. Wet used active carbon 107a is firstly charged in the upper section 101 and the charge is heated by passing electric current between electrodes 103 and 103'. Then the active carbon is heated and its moisture is removed by evaporation. As the temperature of the active carbon rises above 100° C., the volume of the charge decreases rapidly to about 80% of the initial volume, thus forming cracks and voids which makes it difficult to maintain uniform resistance and temperature distributions.

According to this embodiment, when the active carbon 107a in the upper furnace section 101 has heated and dried damper 104 of the upper section is opened to drop the content into the lower furnace section 102. During dropping, coagulated mass of the active carbon is disintegrated so that the active carbon thus transferred into the lower section 103 does not contain any crack or void thereby assuring uniform heating and regeneration. To enhance regeneration steam may be admitted into the lower section through pipe 105.

As an example, the upper section 101 had an inner width of 450 mm and a depth of 360 mm, and the spacing between electrodes was 300 mm. 43 kg of used active carbon which had been treated to adsorb an aqueous solution containing 27 kg of starch was charged into the upper section. The voltage across the electrodes was 130 V and the current was 60 A at the initial stage. Temperature was increased and the moisture was evaporated off after about 1.5 to 2 hours at which time the voltage had increased to 201 V whereas the current had decreased to 48 A. The temperature in the furnace section was not uniform. For example, the temperatures at the upper, middle and lower portions of the furnace section were 117° C., 120° and 147° C., respectively. The power consumption up to this time was 10.6 KWH.

Then the charge was transferred into the lower section 102 having an identical construction as the upper section and heated again by passing single phase alternating current. The initial voltage was 175 V and the current was 48 A. The resistance between the electrodes increased gradually, and the maximum voltage, current and resistance were 204 V, 30 A and 6.8 ohms respectively. Thereafter the temperatures at the upper, middle and lower portions were increased to 870° C., 920° C. and 910° C., respectively. Regeneration was completed by maintaining these temperatures for about one hour while introducing steam. The total power consumption was 26.4 KWH and the total time of regeneration was 3 hours and 30 minutes. The following Table V shows the result of this experiment.

TABLE V

|  | Residual COD (ppm) | Removed COD (ppm) | % of COD removal | % of removal* |
|---|---|---|---|---|
| Active carbon absorbed starch | 65.0 | 30.0 | 31.6 | 53.7 |
| Regenerated active carbon | 40.1 | 54.9 | 57.8 | 98.4 |
| Fresh active carbon | 39.2 | 55.8 | 58.8 | 100 |
| Liquid purified | 95.0 | — | — | — |

*The percentage of COD removal of the fresh active carbon was taken as 100%.

Figure 17:
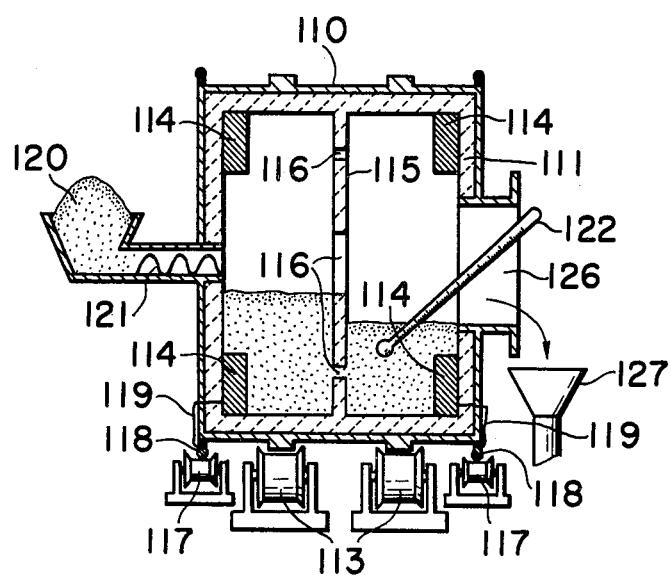
FIG. 17 shows a longitudinal section of another embodiment of this invention and FIG. 18 shows a right-hand end view of the furnace shown in FIG. 17.
Figure 18:
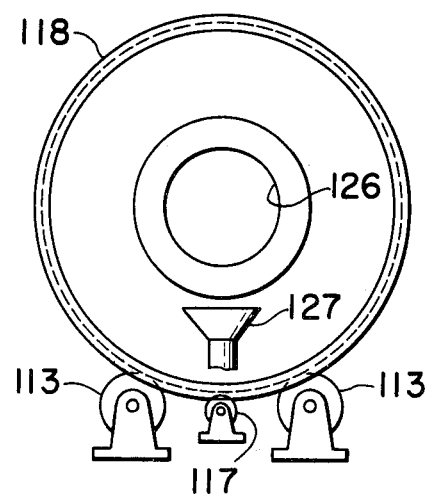

FIGS. 17 and 18 show still further modification of this invention wherein a horizontal rotary furnace is used. Thus, a horizontal cylindrical rotary furnace 110 having a lining of refractory bricks 111 is supported by and driven by a pair of rollers 113. On the opposite inner ends of the furnace are secured annular electrodes 114, each may be a single piece or a plurality of pieces electrically connected together. A transverse partition wall 115 made of electroconductive material such as carbon or metal is secured to the inner surface of the furnace at substantially the axial center thereof, the partition wall 115 being provided with openings 116 about the periphery. If desired such opening can also ba provided at the center of the partition wall 115 which is used to divide the furnace into two sections. The purpose of the openings 116 is to transfer the active carbon to be regenerated from one section to the other of the furnace while it is rotated by rollers 113. Electrodes 114 are connected to a source of single phase alternating current, or a DC source not shown, through conductors 119, contact rings 118 on the outer periphery of the furnace and rollers 117 cooperating with the contact rings 118.

Used active carbon to be regenerated 120 is admitted into the lefthand section of the furnace by means of a screw feeder 121 which may be controlled intermittently by an electrical signal generated by a thermometer 122 located in the righthand section of the furnace. Regenerated active carbon is discharged through a discharge opening 126 and a funnel 127 on the opposide side.

In this embodiment, as the furnace is rotated during operation, the powder of the active carbon is throughly mixed together so that difficulties pointed out hereinabove in connection with stationary furnaces can be efficiently avoided. Moreover, any gas evolved by the treated active carbon can readily be removed. The operation of this embodiment is analogous to that of the embodiment shown in FIG. 16 in that heating up and evaporation of the moisture are performed essentially in the lefthand section and the regeneration is performed in the righthand section. Thus, the active carbon admitted into the lefthand end of the furnace is successively dried and regenerated in an efficient manner. Moreover, since the partition wall 115 is made of electronconductive substance it does not interfere with normal current flow between opposing electrodes.

I claim:

1. A method for regenerating used active carbon which has been used to purify contaminated liquid comprising the steps of:
   providing an airtight vertical furnace having a plurality of vertically spaced sets of electrodes;
   continuously passing said used active carbon downwardly through said airtight furnace past said plurality of vertically spaced sets of electrodes;
   heating said carbon in the upper region of said furnace to a temperature sufficient to evaporate all the moisture contained in said used active carbon and to decompose organic substances deposited on said active carbon by gradually increasing voltage applied across the electrodes in the upper region of the furnace and thereby heating the carbon by virtue of the specific resistance of individual particles and contact resistance between said particles; and
   heating said carbon in the lower region of said furnace to a regenerating temperature from 500° C.–1,000° C. by applying a gradually decreasing voltage across the electrodes and the lower region of said furnace.

2. A method according to claim 1, wherein said furnace has a conical bottom and a rotary valve provided in said bottom.

3. A method according to claim 2 further comprising steps of cooling said conical bottom and discharging regenerated active carbon from said bottom of said furnace through said rotary valve.

4. A method according to claim 1, wherein each electrode set comprises 6 electrodes spaced circumferentially about said furnace with alternate electrodes connected to phase conductors of a three phase alternating current source.

5. A method according to claims 1, 2, 3 or 4 further comprising step of adding a liquid electrolyte to said used activated carbon before it is continuously passed through said furnace.

6. A method according to claim 5, wherein said electrodes are made of heat resistant metal or alloys.

7. A method according to claim 6, wherein said electrodes are made from a heat resistant metal or alloys selected from the group consisting of chromium nickel, nickel-chromium alloys, steel alloys or copper.

8. A method according to claim 1 further comprising the steps of admitting steam into said lower region of said furnace as said used active carbon passes through said lower region.

* * * * *